United States Patent
Freedman et al.

(10) Patent No.: US 12,210,514 B2
(45) Date of Patent: *Jan. 28, 2025

(54) SCHEMA AND DATA MODIFICATION CONCURRENCY IN QUERY PROCESSING PUSHDOWN

(71) Applicant: Microsoft Technology Licensing, LLC, Redmond, WA (US)

(72) Inventors: Craig S. Freedman, Sammamish, WA (US); Adrian-Leonard Radu, Sammamish, WA (US); Daniel G. Schall, Woodinville, WA (US); Hanumantha R. Kodavalla, Sammamish, WA (US); Panagiotis Antonopoulos, Redmond, WA (US); Raghavendra Thallam Kodandaramaih, Redmond, WA (US); Alejandro Hernandez Saenz, Kirkland, WA (US); Naveen Prakash, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,747

(22) Filed: Jul. 31, 2023

(65) Prior Publication Data

US 2023/0376479 A1   Nov. 23, 2023

Related U.S. Application Data

(63) Continuation of application No. 17/180,519, filed on Feb. 19, 2021, now Pat. No. 11,797,523.

(Continued)

(51) Int. Cl.
*G06F 16/00* (2019.01)
*G06F 16/21* (2019.01)
(Continued)

(52) U.S. Cl.
CPC ........ *G06F 16/2379* (2019.01); *G06F 16/211* (2019.01); *G06F 16/2455* (2019.01); *G06F 16/27* (2019.01)

(58) Field of Classification Search
CPC .............. G06F 16/2379; G06F 16/211; G06F 16/2455; G06F 16/27; G06F 16/2308; G06F 16/2474; G06F 16/219
See application file for complete search history.

(56) References Cited

U.S. PATENT DOCUMENTS 6,285,997 B1   9/2001   Carey
6,418,451 B1 * 7/2002   Maimone .............. G06F 16/284
                                                        707/999.103

(Continued)

OTHER PUBLICATIONS

Non-Final Office Action mailed on Dec. 21, 2023, in U.S. Appl. No. 17/935,156, 20 pages.

(Continued)

*Primary Examiner* — Alexander Khong
(74) *Attorney, Agent, or Firm* — Weaver IP L.L.C.

(57) ABSTRACT

Distributed database systems including compute nodes and page servers are described herein that enable compute nodes to pushdown certain query processing compute tasks to the page servers to take advantage of otherwise idle compute resources at the page servers, and to reduce the quantity of data that moves between compute nodes and page servers. A distributed database system includes a page server and a compute node, wherein the page server is configured to maintain multiple versions of stored data objects. The compute node is configured to receive a query and generate a transaction context (TC) and modified table schemas (MTS)

(Continued)

scoped to the query, and pushdown the query, TC and MTS to the page server that is configured to determine which data objects at the page server satisfy the query, and for each such object, which version of the object should be returned based on the TC.

20 Claims, 7 Drawing Sheets

Related U.S. Application Data

(60) Provisional application No. 63/127,847, filed on Dec. 18, 2020.

(51) Int. Cl.
    *G06F 16/23*    (2019.01)
    *G06F 16/2455*    (2019.01)
    *G06F 16/27*    (2019.01)

(56) References Cited

U.S. PATENT DOCUMENTS

| | | | | |
|---|---|---|---|---|
| 11,500,871 B1* | 11/2022 | Kulkarni | ............... | G06N 20/00 |
| 11,625,399 B2 | 4/2023 | Li | | |
| 2007/0016628 A1* | 1/2007 | Barrs | ............... | G06F 16/93 |
| | | | | 707/999.203 |
| 2011/0016127 A1* | 1/2011 | Uppala | ............... | G06F 16/245 |
| | | | | 707/E17.014 |
| 2015/0227533 A1* | 8/2015 | Goldstein | ............ | G06F 40/166 |
| | | | | 707/661 |
| 2015/0281400 A1 | 10/2015 | Harter | | |
| 2016/0085643 A1* | 3/2016 | Mcalister | ............... | G06F 16/27 |
| | | | | 714/4.12 |
| 2016/0125000 A1* | 5/2016 | Meacham | ............ | G06F 16/1865 |
| | | | | 707/638 |
| 2018/0032412 A1* | 2/2018 | Zhou | ............... | G06F 11/1474 |
| 2019/0079834 A1* | 3/2019 | De Schrijver | ...... | G06F 12/0875 |
| 2020/0050692 A1 | 2/2020 | Antonopoulos | | |
| 2020/0142868 A1* | 5/2020 | Varadarajan | ............. | G06F 16/278 |
| 2020/0192865 A1* | 6/2020 | Eads | ............... | G06F 16/2471 |
| 2021/0157810 A1 | 5/2021 | Liu | | |
| 2023/0139988 A1* | 5/2023 | Ma | ............... | G06F 16/221 |
| | | | | 707/705 |

OTHER PUBLICATIONS

"Notice of Allowance Issued in U.S. Appl. No. 17/180,508", Mailed Date: Sep. 1, 2023, 10 Pages.

Robinson, John T., "The K-D-B-Tree: A Search Structure for Large Multidimensional Dynamic Indexes", In Proceedings of the ACM SIGMOD International Conference on Management of Data, Apr. 29, 1981, pp. 10-18.

Antonopoulos, et al., "Socrates: The New SQL Server in the Cloud", SIGMOD '19: Proceedings of the 2019 International Conference on Management of Data, Jun. 25, 2019, pp. 1743-1756.

Communication pursuant to Article 94(3) Received in European Patent Application No. 21819292.0, mailed on Aug. 2, 2024, 14 pages.

Final Office Action mailed on Jun. 27, 2024, in U.S. Appl. No. 17/935,156, 16 pages.

Notice of Allowance mailed on Oct. 17, 2024, in U.S. Appl. No. 17/935,156, 8 pages.

* cited by examiner

SCHEMA AND DATA MODIFICATION CONCURRENCY IN QUERY PROCESSING PUSHDOWN

CROSS-REFERENCE TO RELATED APPLICATIONS

This application is a continuation of pending U.S. patent application Ser. No. 17/180,519, entitled "SCHEMA AND DATA MODIFICATION CONCURRENCY IN QUERY PROCESSING PUSHDOWN," and filed on Feb. 19, 2021, which claims priority to U.S. Provisional Patent Application No. 63/127,847, entitled "SCHEMA AND DATA MODIFICATION CONCURRENCY IN QUERY PROCESSING PUSHDOWN," and filed on Dec. 18, 2020, the entireties of which are incorporated by reference herein.

BACKGROUND

Typical distributed database systems divide storage and compute workloads between a number of distributed components. Such a system may include, for example, one or more compute nodes/servers, page servers and storage components. Such systems divide system functions between compute and storage whereby compute nodes handle all incoming user queries and query processing activities, whereas page servers couple to storage components to provide a scaled-out storage engine with each page server responsible for a subset of pages of a database. In such a configuration, page servers are limited to serving pages to compute nodes and updating respective pages based on ongoing transaction activity.

Such an architecture enables scaling out to 100+ terabyte sized databases, fast database restores, near-instantaneous backups, and the ability to rapidly scale up and down. The above described configuration provides flexibility, scalability and performance for online transaction processing and/or hybrid analytical processing workloads that require high transaction throughput while also enabling real-time analytics.

Such systems may not, however, prove optimal for purely analytical workloads that are scan-intensive over very large data sets since all query processing is performed at compute node(s) which necessitates moving large amounts of data from the page servers to the compute nodes for processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed database systems including compute nodes and page servers are described herein that enable compute nodes to pushdown certain query processing compute tasks to the page servers to take advantage of otherwise idle compute resources at the page servers, and to reduce the quantity of data that moves between compute nodes and page servers. In an example aspect, a distributed database system includes first and second page servers and a compute node, wherein each of the page servers is configured to maintain multiple versions of stored data objects, and wherein each version corresponds to a transaction. In a further aspect, the first page server is configured to receive a query and transaction context from the compute node, determine which data objects corresponding to the first page server satisfy the query, and for each such object, determine which version of the object should be returned by first page server responsive to the query. In a further aspect, the first page server determines which version of an object should be returned by comparing certain transaction identifiers and timestamps to determine which version should be visible to the query at a particular time.

In are further example aspect, the compute node is configured to modify table metadata to permit concurrent queries against different versions of a table schema. In another aspect, the compute node is configured to modify object identifiers such that query processing at a page server treats corresponding objects as being globally unique.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
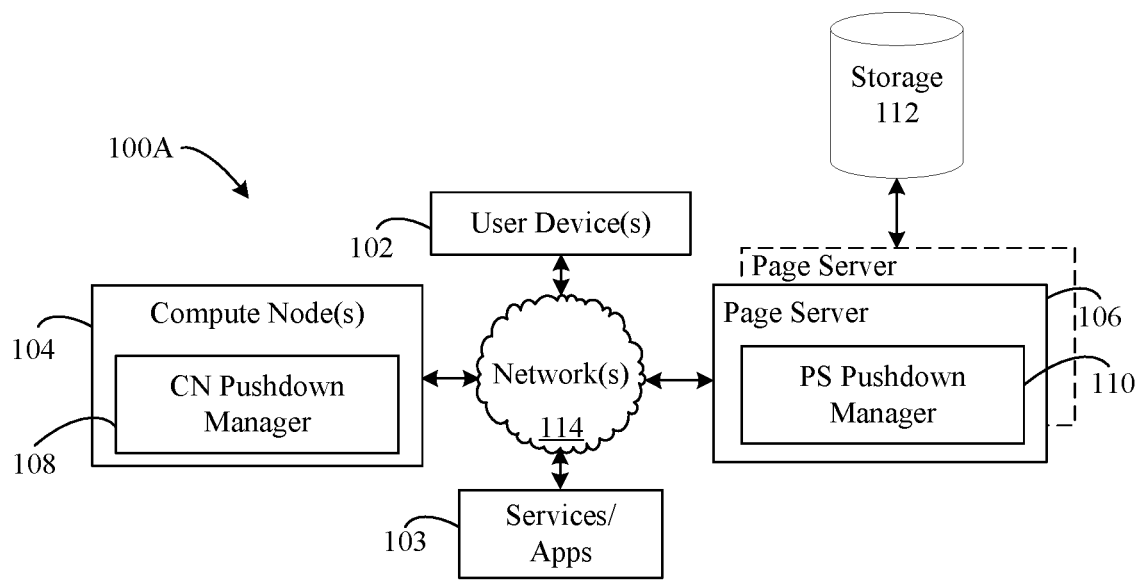
FIG. 1A depicts a block diagram of a system for data and schema modification concurrency in query processing pushdowns, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for concurrent data and schema modification in query processing pushdowns. Section III below describes example computing device embodiments that may be used to implement features of the embodiments described herein. Section IV below describes additional examples and advantages, and Section V provides some concluding remarks.

II. Example Embodiments

Embodiments herein are described in the context of query processing and query processing pushdowns as non-limiting and exemplarily illustrative examples, including various types of operations performed in association with query processing and query processing pushdowns. However, embodiments herein are not so limited, and their principles and functions are applicable to other types of processing task, applications, and/or services, in which offloading of operations from a primary computing system may be advantageously implemented. A general description of the operating environment of embodiments and design motivations and descriptions follows immediately below, with a detailed description of further embodiments to follow.

As described above, distributed database systems exist whereby compute resources and storage resources are segregated such that one or more compute nodes (i.e., servers dedicated to performing 'compute' functions) are coupled to, for example, n page servers with each page server managing access to and/or modification of one $n^{th}$ of the pages that comprise the data stored in the database. In such a system, compute nodes handle all incoming user queries and query processing activities, whereas page servers couple to storage components to provide a scaled-out storage engine with each page server responsible for its subset of pages of the database. In such a configuration, page servers are limited to serving pages to compute nodes and updating respective pages based on ongoing transaction activity.

Although such systems can provide very high transaction throughput, such systems may not be optimal for analytical workloads that are scan-intensive over very large data sets. For example, consider the following analytical query against a table with 1.5B rows that cannot leverage the existing indexes for a seek operation:

| QUERY 1 |
|---|
| SELECT AVG([T_TRADE_PRICE] * [T_QTY]) AS [Average Sale Amt] |
| FROM [dbo].[TRADE] |
| WHERE [T_COMM] > 95.00; |

QUERY 1 is looking for the average stock sale for transaction commissions greater than $95.00. Supposing there are 245,598 rows where the commission is higher than $95.00, this means we have a selective filter considering the overall size of the table. But because T_COMM is not the leading column of an existing index, we must scan each row in the table. That is, every one of the 1.5B rows of the table must be scanned to apply the filter, where such rows are stored in numerous pages corresponding to a number of page servers. Thus, to perform such scanning, several remote IOs must issue from the page server(s) to the compute node to provide the required pages thereto, wherein the compute node must then apply the filter to each row and then aggregate the results of the filter operation. It may be appreciated that such a query could consume a large amount of system resources both in terms of network traffic since *all* the pages corresponding to a table must be transferred to the compute node, and consumption of compute cycles on the compute node which in turn leads to reduced I/O for the node (i.e., fewer transaction per second).

Embodiments described herein enable query processing (QP) pushdown whereby certain query processing operations corresponding to a query may be offloaded ("pushed down") to respective page servers to improve overall system performance. For example, a compute node may be configured to pushdown QUERY 1 shown above to each page server, each server may then apply the filter to the rows that the page server possesses, and return such rows to the compute node. The compute node thereafter must simply aggregate the result sets provided by each page server. In this scenario, the compute resources of each page server are used to apply the filter, and the only data to cross the wire is 245,598 rows of the result set rather than all 1.5B rows of the table.

Figure 1B:
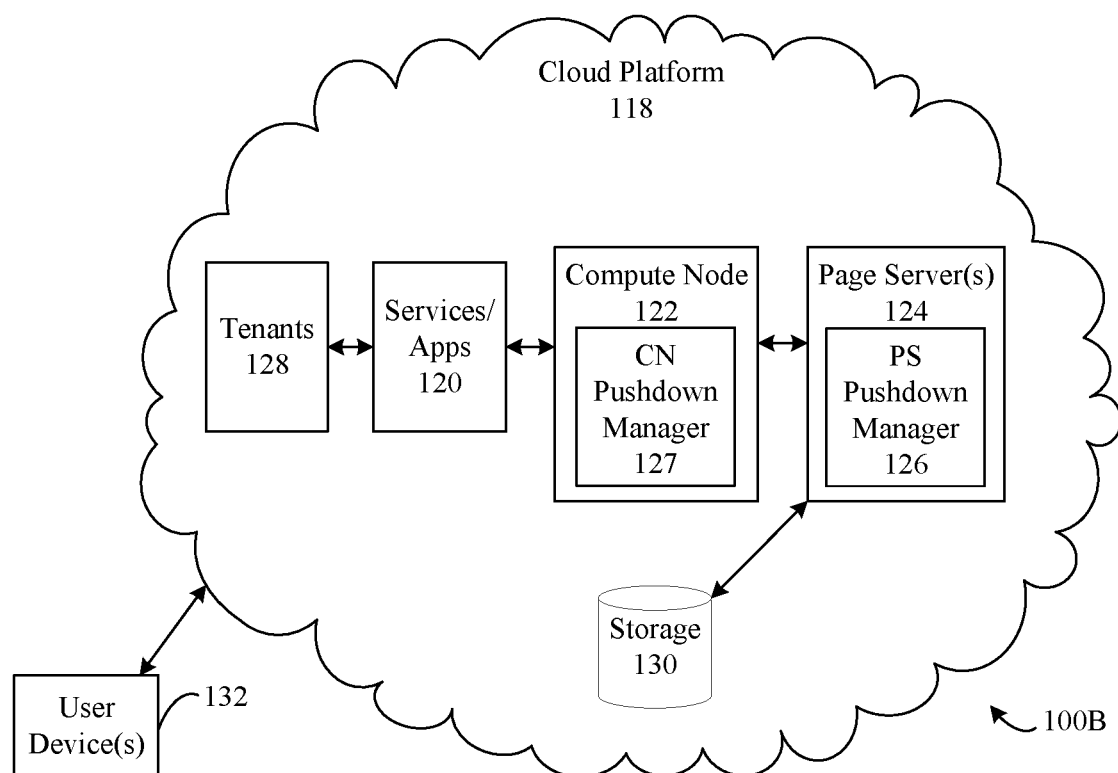
FIG. 1B depicts a block diagram of a cloud-based system for data and schema modification concurrency in query processing pushdowns, according to an example embodiment.

Due to the transactional nature of the system, however, not all compute nodes and/or page servers will be synchronized at any given moment. Embodiments described herein employ query pushdown while also providing concurrency in the face of both data and metadata (i.e., schema) modification. Systems, devices, and apparatuses may be configured in various ways for maintaining concurrency of data and metadata modifications in query processing pushdowns. For instance, FIG. 1A and FIG. 1B will now be described. FIG. 1A shows a block diagram of a system 100A, and FIG. 1B shows a block diagram of a cloud-based system 100B, each configured for schema and data modification concurrency in query processing pushdowns.

As shown in FIG. 1A, system 100A includes user device(s) 102 (also user device 102 herein), services/applications host 103, a compute node(s) 104, and a page server(s) 106. In embodiments, user device 102, services/applications host 103, compute node(s) 104, and page server(s) 106 communicate with each other over a network 114. A storage 112 is also shown in communication with page server(s) 106. It should be noted that in various embodiments, different numbers of user devices, hosts, compute nodes, page servers, and/or storages are present. Additionally, according to embodiments, any combination of the systems and/or components illustrated in FIG. 1A are present in system 100A.

Network 114 comprises different numbers and/or types of communication links that connect computing devices and hosts/servers such as, but not limited to, the Internet, wired or wireless networks and portions thereof, point-to-point connections, local area networks, enterprise networks, cloud networks/platforms, and/or the like, in embodiments. In an example, network 114 may be a cloud-based platform network and/or enterprise network through which a user device connects to or accesses a service/application that may in turn cause performance of operations by compute nodes and page servers on data persisted in a data storage.

Storage 112 may be any type and/or number of data storage devices or systems, and may comprise internal and/or external storage in various embodiments. While storage 112 is shown in communication with page server(s) 106, in some embodiments, storage 112 may be connected to network 114, or may comprise a portion of page server(s) 106. Storage 112 may comprise a monolithic storage device/system, a cloud-based storage system, a distributed storage system, and/or the like.

User device(s) 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for page split detection and affinity in query processing pushdowns, e.g., providing queries to a database (DB) server of services/applications host 103, as well as for performing client-side functions/operations of client-server scenarios. User device 102 also includes additional components (not shown for brevity and illustrative clarity) including, but not limited to, components and subcomponents of other devices and/or systems herein, in various embodiments.

User device(s) 102 may be a computing device associated with a domain which, as used herein, generally refers to a physical and/or logical system boundary under the control of an entity within which applications and/or services are hosted, offered, managed, and/or otherwise implemented, and also encompasses subdomains and/or the like in embodiments. Exemplary, non-limiting domains include, without limitation, web domains, tenancies of hosted cloud platforms, cloud service providers, enterprise systems, and/or any other type of network or system. A tenant is particular type of domain that is a representation of an organization in a cloud platform. The domain of the tenant in the cloud platform is its tenancy in which the tenant registers and manages applications, stores data/files, accesses services, etc.

Services/applications host 103 comprises one or more server computers or computing devices, such as an on-premises server(s) in addition to, or in lieu of, cloud-based servers. Services/applications host 103 may host one or more services or applications, as would be understood by persons of skill in the relevant art(s) having the benefit of this disclosure, and may act as a portal or interface for users/tenants using user device(s) 102 by which access to compute node(s) 104 is obtained. In some embodiments, services/applications host 103 may host a database server front end that utilizes compute node(s) 104 and page server(s) 106 as a back end. Furthermore, although embodiments described herein are couched in terms of compute nodes and page servers, it should be understood that such terms are adopted for illustrative purposes only. That is, although the respective roles of compute nodes and page servers are described herein as being separate, embodiments exist wherein compute nodes may each act like a page server for some subset of pages, and all compute nodes may requested pages from, and/or pushdown queries to, one another.

Compute node(s) 104 comprises one or more server computers or computing devices, such as an on-premises server(s) in addition to, or in lieu of, cloud-based servers. Compute node(s) 104, as shown, includes a compute node (CN) pushdown manager 108. CN pushdown manager 108 is configured to determine and provide modified operations, operation fragments, modified metadata, page indexes associated with data pages for operations, and/or the like in the context of QP pushdowns to page server(s) 106. CN pushdown manager 108 may also be configured to receive data, from data pages managed by page server(s) 106, and in embodiments, some such data may be processed by page server(s) 106 based on QP pushdown requests provided to page server(s) 106 from CN pushdown manager 108. In such embodiments, CN pushdown manager 108 provides this processed data to a query processor or operations processor of compute node(s) 104 (described in further detail below) for performing QP operations at compute node(s) 104.

Page server(s) 106 comprises one or more server computers or computing devices, such as an on-premises server(s) in addition to, or in lieu of, cloud-based servers. Page server(s) 106, as shown, include a page server (PS) pushdown manager 110. PS pushdown manager 110 is configured to perform certain QP pushdown operations provided by CN pushdown manager 108 from one or more compute node(s) 104. For example, pushed down query processing commands may filter versions of rows that are not be visible at a particular time, and as will be discussed in further detail herein below.

It should also be noted that embodiments herein contemplate that compute node(s) 104, page server(s) 106, storage 112, and/or services/applications host 103 may comprise a portion of an enterprise network portion of network(s) 114 with which user device(s) 102 communicate over the Internet.

Turning now to FIG. 1B, system 100B is a cloud-based embodiment of system 100A of FIG. 1A. As shown, system 100B includes a cloud platform 118. In embodiments, cloud platform 118 is a cloud-based platform such as Microsoft® Azure® from Microsoft Corporation of Redmond, WA, that is accessible by one or more users of user device(s) 132 (also user device 132 herein) over a network (not shown here for illustrative clarity and brevity).

User device 132 may be any type and/or number of user device, such as devices similar to those described for user device 102 in FIG. 1A, and may correspond to tenants and/or end users, IT personnel, administrators of systems described herein, of different domains, such as different tenancies within cloud platform 118.

A tenant in the context of FIG. 1B is a representation of an organization in a cloud platform. The domain of the tenant in the cloud platform is its tenancy in which the tenant registers and manages applications, stores data/files, accesses services, etc., hosted by cloud platform 118. Cloud platform 118 is illustrated as hosting tenancies 128 which comprises one or more tenants. Tenants are enabled to provide applications/services, hosted by cloud platform 118, to users such as end users of tenancies 128. In doing so, a tenant may lease or purchase the use of system resources within cloud platform 118 for such hosting and may utilized system resources and/or operations for providing their services to end users.

For instance, cloud platform 118 may host a tenant of tenancies 128 (which may include partners and/or service providers of the owner of cloud platform 118), a tenant that provides servicers for a database server of services/applications 120 (also "services/apps" 120 herein) of cloud platform 118, in embodiments. Users of user device(s) 132 having credentials for ones of tenancies 118 are allowed to authenticate for this tenancy and access data, information, services, applications, etc., e.g., services/apps 120 of cloud platform 118, allowed or instantiated for the tenant.

Compute node(s) 122 and CN pushdown manager 127 may be respective embodiments of compute node(s) 104 and CN pushdown manager 108 of FIG. 1A, in the context of cloud platform 118. Page server(s) 124 and PS pushdown manager 126 may be respective embodiments of page server(s) 106 and PS pushdown manager 110 of FIG. 1A, in the context of cloud platform 118. Storage 130 may be an embodiment of storage 112 of FIG. 1A, in the context of cloud platform 118.

Cloud platform 118 includes one or more distributed or "cloud-based" servers, in embodiments. That is, cloud platform 118 is a network, or "cloud," implementation for applications and/or services in a network architecture/cloud platform. A cloud platform includes a networked set of computing resources, including servers, routers, etc., that are configurable, shareable, provide data security, and are accessible over a network such as the Internet, according to embodiments. Cloud applications/services are configured to run on these computing resources, often atop operating systems that run on the resources, for entities that access the applications/services, locally and/or over the network. A cloud platform such as cloud platform 118 is configured to support multi-tenancy as noted above, where cloud platform-based software services multiple tenants, with each tenant including one or more users who share common access to certain software services and applications of cloud platform 118, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

Portions of FIGS. 1A and 1B, and system 100A and system 100B respectively, such as compute node(s) 104 and/or 122, page server(s) 106 and/or 124, storage 112 and/or 130, and/or cloud platform 118 also include additional components (not shown for brevity and illustrative clarity) including, but not limited to, components and subcomponents of other devices and/or systems herein, e.g., an operating system, as shown in FIG. 8 described below, in embodiments.

Additionally, as would be understood by persons of skill in the relevant art(s) having the benefit of this disclosure, system 100A and system 100B illustrate embodiments in which system resources utilized for applications and/or services, such as database server hosting, may be scaled out on demand or as needed to any size, throughput, capacity, etc., and the embodiments herein provide for the pushdown of operations to page servers that were up until now performed exclusively by compute nodes, and also provide for specific handling of different operations and functions by compute nodes and/or page servers to successfully and accurately perform these pushdown operations. A non-exhaustive list of non-limiting examples of such specific handling may include providing schema and data modification concurrency or the like as described herein. Systems, devices, and apparatuses are configured in various ways for schema and data modification concurrency in query processing pushdowns, in embodiments.

Figure 2:
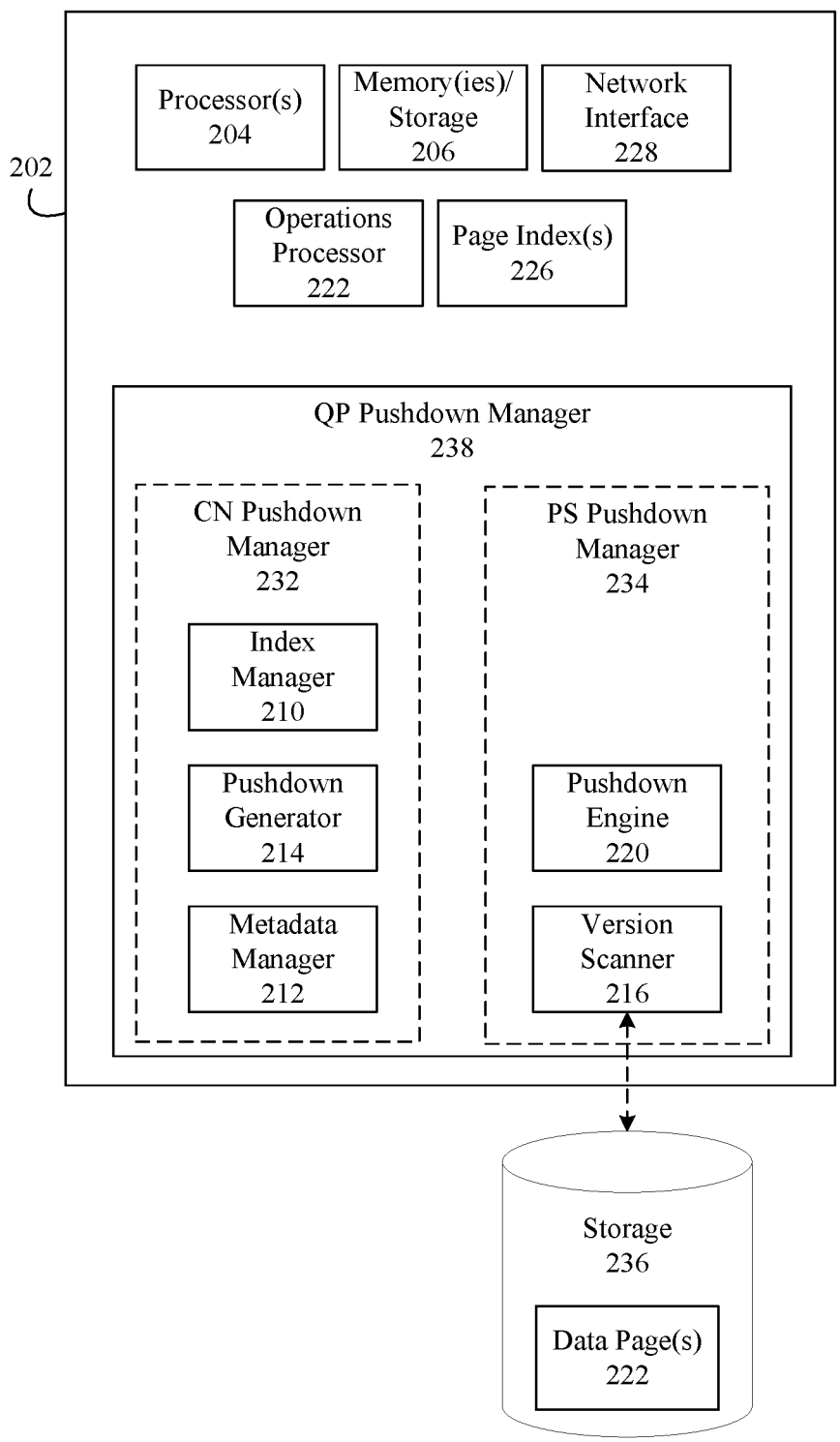
FIG. 2 depicts a block diagram of a computing system configured for data and schema modification concurrency in query processing pushdowns, according to an example embodiment.

FIG. 2 depicts a block diagram of a system 200 configured for concurrent data and schema modification in query processing pushdowns, according to an example embodiment. System 200 as exemplarily illustrated and described is configured to be an embodiment of system 100A of FIG. 1A and/or system 100B of FIG. 1B. System 200 is described as follows.

System 200 includes a computing system 202 and a storage 236. Computing system 202 may comprise any type of server or computing system, as mentioned elsewhere herein, or as otherwise known, including without limitation cloud-based systems, on-premises servers, distributed network architectures, and/or the like, and may be configured as a compute node and/or as a page server, in various examples as described herein. For example, computing system 202 may be configured to operate as one of compute node(s) 104 and/or 122 as shown in FIGS. 1A and 1B, respectively. Likewise, computing system 202 may be configured to operate as one of page server(s) 106 and/or 124 as shown in FIGS. 1A and 1B, respectively.

As shown in FIG. 2, system 200 includes a computing system 202 and a storage 236. Computing system 202 includes a processor 204, a memory/storage 206, a network interface 228, an operations processor 222, a page index(s) 226 and a query processing (QP) pushdown manager 238. Storage 236 includes data page(s) 222. QP pushdown manager 238 includes a CN pushdown manager 232 or a PS pushdown manager 234 depending on whether computing system 202 is operating as a compute node or a page server, and as will be described in further detail below. CN pushdown manager 232 includes an index manager 210, a pushdown generator 214 and a metadata manager 212. PS pushdown manager 234 includes a pushdown engine 220 and a version scanner 216. These components of system 200 are described as follows.

Storage 236 and may be configured as, or similarly as, storage 112 and/or 130 of FIGS. 1A and 1B, respectively. Similarly, QP pushdown manager 238 may comprise an embodiment of one or more of CN pushdown manager 108 and/or CN pushdown manager 127 of FIGS. 1A and 1B, respectively, and which correspond to CN pushdown manager 232 and PS pushdown manager 234, respectively.

It is contemplated herein that any components of system 200 may be grouped, combined, separated, etc., from any other components in various embodiments, and that the illustrated example of system 200 in FIG. 2 is non-limiting in its configuration and/or numbers of components, as well as the exemplary arrangement thereof. Moreover, it should be understood that components such as, for example, processor(s) 204, memory(ies)/storage 206 and/or network interface 228 may include a plurality of instances of such components whether physical or virtual.

Processor(s) 204 and memory(ies)/storage 206 may respectively be any type of processor circuit(s)/system(s) and memory that is described herein, and/or as would be understood by a person of skill in the relevant art(s) having the benefit of this disclosure. Processor(s) 204 and memory(ies)/storage 206 may each respectively comprise one or more processors or memories, different types of processors or memories (e.g., one or more types/numbers of caches for query processing, allocations for data storage, etc.), remote processors or memories, and/or distributed processors or memories. Processor 204 may be multi-core processors configured to execute more than one processing thread concurrently. Processor(s) 204 may comprise circuitry that is configured to execute and/or process computer program instructions such as, but not limited to, embodiments of QP pushdown manager 238, including one or more of the components thereof as described herein, which may be implemented as computer program instructions, as described herein. For example, in performance of/operation for flowchart 400 of FIG. 4, as described in detail herein below, processor(s) 204 may execute program instructions as described.

Operations processor 222 may be a query processor or a portion of a database server/system, in embodiments, configured to perform database operations such as performing queries against a database. Operations processor 222 may comprise program instructions that are carried out by processor(s) 204, in embodiments, or may be a hardware-based processing device as described herein.

Memory(ies)/storage 206 includes volatile storage portions such as a random access memory (RAM) and/or persistent storage portions such as hard drives, non-volatile RAM, and/or the like, to store or be configured to store computer program instructions/code for schema and data modification concurrency in query processing pushdowns, as described herein, as well as to store other information and data described in this disclosure including, without limitation, embodiments of QP pushdown manager 238, including one or more of the components thereof as described herein, and/or the like, in different embodiments.

Page index(es) 226 comprises an index of data pages associated with one or more databases, wherein the index(es) identifies parent and leaf data page structures as well as page servers that maintain particular data pages. In embodiments, page index(es) 226 may also include data utilized and/or generated in performance of operations/functions noted herein, and/or the like, such as metadata, etc. In the context of a compute node, for example, where QP pushdown manager 238 comprises CN pushdown manager 232, page index(es) 226 may include information that reflects which page server of page server(s) 110 maintains a particular data page of the database. Alternatively, when considered in the context of a page server wherein QP pushdown manager 238 comprises PS pushdown manager 234, page index(es) 226 may include information regarding the data pages of the database maintained by the page server associated with PS pushdown manager 110 (i.e., a page server of page server(s) 106). In an embodiment, page index(es) 226 is included in computing system 202 of as depicted in FIG. 2. As such, page index(es) 226 may be held entirely in memory such as, for example, memory(ies)/storage 206. In other embodiments, however, page index(es) 226 may be maintained in storage 236 or a combination of both computing system 202 and storage 236.

Storage 236 may be internal and/or external storage or any type, such as those disclosed herein. In embodiments, storage 236 stores one or more data pages that comprise a database object or database file, and that may be accessed only by or through a page sever. When configured to function as a page server, system 200 stores any number of data pages in storage 236. Additionally, more than one page server may be implemented via multiple instances of system 200, and data pages of a database object or database file may be large enough in number and/or data size such that data pages of a single database object or database file span multiple instances of storage 236 across multiple, respective page servers. In embodiments where system 200 is configured to function as a compute node, storage 236 may instead store data pages and/or portions of data pages provided from one or more pages servers responsive to requests from the compute node.

Network interface 228 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100A in FIG. 1A and/or system 100B in FIG. 1B, over a network/cloud platform such as network 112 and/or cloud platform 134.

System 200 also includes additional components (not shown for brevity and illustrative clarity) including, but not limited to, components and subcomponents of other devices and/or systems herein, as well as those described below with respect to FIG. 8 e.g., an operating system, etc., according to embodiments.

In embodiments, computing system 202 may be configured as a compute node and/or as a page server, and QP pushdown manager 238 of computing system 202 may be correspondingly configured in such embodiments. That is, QP pushdown manager 238 may be configured as a CN pushdown manager or a PS pushdown manager, each depicted as CN pushdown manager 232 and PS pushdown manager 234, respectively, in FIG. 2. Accordingly, QP pushdown manager 238 may be implemented in various ways to include a plurality of components for performing the functions and operations described herein for providing concurrency in the face of data and schema modification in query processing pushdowns, in a compute node context and/or in a page server context.

As mentioned above, system 200 of FIG. 2 illustrates two non-exclusive options for configuring QP pushdown manager 238: a CN pushdown manager 232 and a PS pushdown manager 234. CN pushdown manager 232 includes, without limitation, an index manager 210, a metadata manager 212, and a pushdown generator 214. PS pushdown manager 234 includes, without limitation, a pushdown engine 220 and a version scanner 216, although additional components, as described herein or otherwise, are also included and some components may be excluded, in various embodiments. For example, and as discussed further herein below, PS pushdown manager 234 may optionally include its own instance of metadata manager 212. Each of these components will now be described in turn.

Index manager 210 is configured to determine indexes of data pages required for QP pushdown operations based on page index(es) 226. In embodiments, this may include next data pages associated with data pages to be read by a page server. Metadata manager 212 is configured to determine metadata needed for, and to generate versions of metadata and/or modify metadata associated with a database for, performing different operations described herein such as QP pushdown operations to be performed by a page server. Such metadata may comprise, for example, one or more schemas each corresponding to a database object (e.g., a table) stored on data pages on one or more page servers, wherein such schemas are maintained by computing system 202. In embodiments, metadata manager 212 is configured to serialize metadata required for operations that is provided to a page server. Metadata manager 212 may also modify metadata to permit concurrent queries against different versions of the same metadata, and as will be discussed in further detail below.

Pushdown generator 214 is configured to generate pushdown operations at a compute node for provision to a page server. In embodiments, pushdown generator 214 generates query fragments (e.g., including query operators, expressions, etc.) that, along with appropriate metadata, are assembled to form query plans for QP pushdown operations performed by one or more page servers that would otherwise be incapable of performing the required QP pushdown operations.

Pushdown engine 220 is configured to generate QP pushdown operations, from information provided by a compute node, such that operations processor 222 is enabled to process the operations. For example, pushdown engine 220 may work in conjunction with operations processor 222 to determine which rows are within the scope of a QP pushdown operation.

As will be discussed in greater detail below, version scanner 216 is configured to accept a transaction context and query or query fragment, and determine which versions of relevant rows are visible given the transaction context and select such rows for inclusion in the query result returned by the PS pushdown manager 234.

Having provided an introduction to embodiments of compute nodes and page servers along with a general description of the functions performed by components of such embodiments, this written description now turns to a description of the need for the concurrency benefits provided by embodiments. Such description will be made with reference to FIG. 3 which depicts a block diagram of a distributed database system 300 configured for concurrent data and schema modification, according to an example embodiment.

Figure 3:
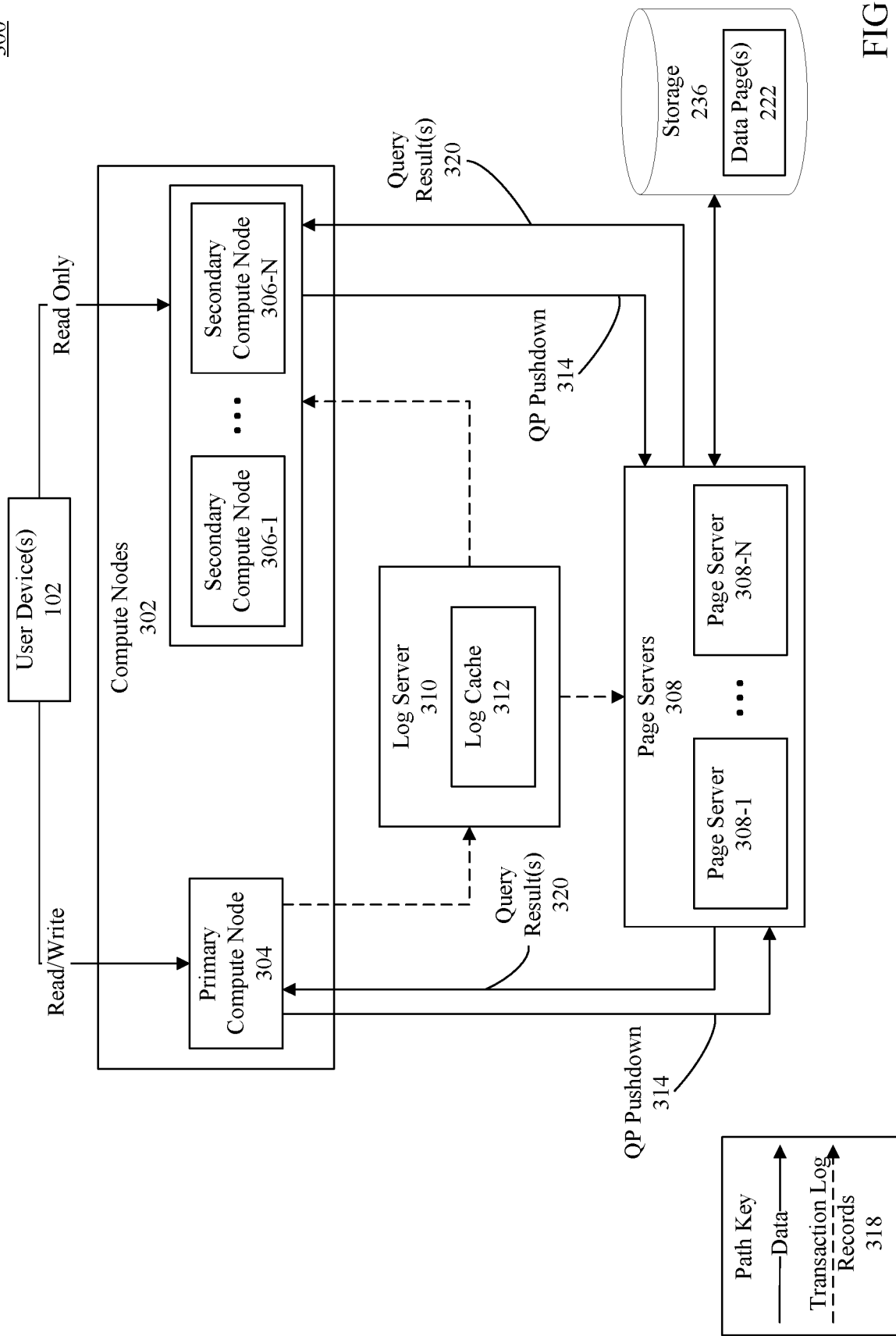
FIG. 3 depicts a block diagram of a distributed database system configured for data and schema modification concurrency in query processing pushdowns, according to an example embodiment.

Distributed database system 300 as shown in FIG. 3 includes a user device(s) 102, compute nodes 302, a log server 310, page servers 308 and storage 236. Compute nodes 302 includes a primary compute node 304, and a set of secondary compute nodes 306-1 through 306-N. Likewise, page servers 308 includes a set of page servers 308-1 through 308-N. Log server 310 includes log cache 312.

User device(s) 102 are coupled to one or more compute nodes and provide a workload to distributed database system 300 in the form of transactions and other queries. The primary and secondary compute nodes of compute nodes 302 are coupled to log server 310 and to one or more of page servers 308.

Note, that although embodiments may at times be described herein in the context of a user device such as user device(s) 102 providing queries or a workload of queries and receiving query results in return, embodiments are not limited to operating with or through user devices such as user device(s) 102. Indeed, embodiments described herein may perform queries for or on behalf of any source of such queries, and provide query results to same, or to some other source or entity. For example, queries may be generated by computing components (not shown in FIG. 3) and provided to embodiments for execution. Thereafter, embodiments may execute the queries in the manner described herein and provide the results either directly back to the query source, or to some other location, entity or component as appropriate.

As described above, each of page servers 308 is configured to handle a subset of the pages that make up the database. Although storage 236 and data page(s) 222 stored therein are shown as a monolithic storage, embodiments are not so limited. In alternative embodiments (not shown), each of page servers 308 may be coupled to a dedicated storage that includes only the data pages corresponding to that page server. Likewise, embodiments may be configured anywhere in between with some of the pages corresponding to a given page server being stored at one location on one storage unit, and other pages elsewhere.

As mentioned herein above, distributed database system 300 may be configured to perform transaction processing. Embodiments of distributed database system 300 are ACID compliant. As known in the art, ACID is an acronym that denotes a set of properties of database transactions that ensure that data persisted to the database is valid despite errors that may arise due to, for example, hardware failures or power failures. The ACID are Atomicity, Consistency, Isolation and Durability. Transactions performed by distributed database system 300 are ACID compliant inasmuch as the operations that logically correspond to the transaction collectively satisfy the ACID properties.

The Atomicity property of a transaction demands that the transaction either completely succeed, or completely fail. For a transaction to completely fail means that the database is left unchanged. For example, suppose a transaction comprises transferring money from account A to account B. The entire transaction comprises a number of steps as follows: funds are debited from account A, funds are transferred to wherever account B is held, and funds are credited to account B. In this situation, atomicity guarantees that no funds are debited from account A if, for whatever reason, funds are not credited to account B.

The Consistency property ensures that a transaction conform to all applicable rules governing the storage of the data such that the transaction brings the database from one valid state to another valid state.

The Isolation property ensures that different transactions that execute concurrently leave the database in the same state that would have been obtained if the transactions were executed in series. Isolation is the main goal of concurrency control, and embodiments discussed further herein below enforce such concurrency controls.

Finally, the Durability property guarantees that once a transaction is committed (i.e., completed and persisted to the database in an ACID compliant manner), the transaction will remain committed and that no hardware, system or power failure can cause transaction to be lost or for the database to enter an otherwise inconsistent state. With further reference to distributed database system 300 of FIG. 3, ACID properties of transactions performed by distributed database system 300 are ensured, in part, through the use of log server 310 as follows.

In an embodiment, primary compute node 304 is configured to perform both read and write operations, whereas secondary compute nodes 306-1 through 306-N are configured to perform read-only operations. Thus, only primary compute node 304 can perform transactions that alter the state of the database. In order to maintain the ACID properties of the transaction, primary compute node 304 may be configured to generate a log record for the transaction when the transaction commits and store that record locally in a transaction log before any data modifications caused by the transaction are written to disk.

A log record for a committed transaction includes all the information necessary to re-do the transaction in the event there is a problem (e.g., power failure) before the data modified by the transaction can be stored (e.g., in data page(s) 222 of storage 236). A log record may comprise information that includes, but is not limited to, a transaction identifier, a log sequence number, a time stamp, information indicating what data object or objects was/were modified and how, and the like.

Regarding a log sequence number, the transaction log operates logically as if the transaction log is a sequence of log records with each log record identified by a log sequence number (LSN). Each new log record is written to the logical end of the transaction log with an LSN that is higher than the LSN of the record before it. Log records are stored in a serial sequence as they are created such that if LSN2 is greater than LSN1, the change described by the log record referred to by LSN2 occurred after the change described by the log record LSN1. Each log record also contains a transaction identifier of the transaction to which it belongs. That is, a transaction identifier is information that uniquely identifies the transaction corresponding to the log record (e.g., a universally unique identifier (UUID) or globally unique identifier (GUID)).

The log record corresponding to the transaction is thereafter forwarded to the log server 310 which is configured to provide a log service, in an embodiment. The log service on log server 310 accepts log records from the primary compute node 304, persists them in log cache 312, and subsequently forwards the log records to the rest of compute replicas (i.e., secondary compute node 306-1 to 306-N) so they can update their local log caches. Log server 310 also forwards the log records to the relevant page server(s) so that the data can be updated there. In this way, all data changes from primary compute node 304 are propagated through the log service to all the secondary compute nodes and page servers. Finally, the log records are pushed out to long-term storage such as, for example, storage 236. In addition to transaction commits, other types of operations are may also be recorded at primary compute node 304 and subsequently be forwarded to including, but not limited to, the start of a transaction, extent and page allocation or deallocation, creating or dropping a table or index and every data or schema modification.

As mentioned above, log server 310 causes transaction log records to be replicated to secondary compute nodes and page servers. In the context of QP pushdown, different page servers may each be called upon to perform query processing tasks at the same time (i.e., concurrently). However, log records may not replicate from log server 310 to each page server and/or secondary compute node at the same rate, and/or processing of log records at each page server or compute node may proceed at different rates. Taken together, this means that different page servers/compute nodes may not have the same views of the data which can lead to inconsistencies. Accordingly, embodiments described herein prevent adverse effects in the face of concurrent updates to data and/or metadata through the use row versioning-based snapshot isolation, while simultaneously causing the system to treat the metadata corresponding to data objects as being unique in all cases to avoid the inconsistencies that ordinarily could arise due to mixing snapshot isolation with concurrent metadata updates. Each of these is discussed in turn below.

Note that although embodiments herein are sometimes couched in terms of data objects and concepts conventionally related to relational databases (e.g., terms such as 'rows', 'tables', 'schema'), it should be understood that embodiments are not limited to relational databases nor particular types of objects such as tables or row. For example, the concept of row versioning and its use in snapshot isolation is equally applicable to other types of data objects that are not rows in a relational table. For example, versioning may usefully be employed to enable access concurrency to blobs or other types of unstructured data. Thus, the terms "data object" and "row" may at times be used herein in a manner that appears equivalent, no such equivalency should be inferred.

Row versioning is a framework that invokes a copy-on-write mechanism when a row is modified or deleted. This requires that while the transaction is running, the old version of the row must be available for transactions that require an earlier transactionally consistent state. Accordingly, when a row versioning-based isolation level is enabled, the database engine (e.g., operations processor 222 of computing system 202 as illustrated in FIG. 2) stores a version of each row each time that row is modified. Each new version of a row may be stored along with the transaction identifier of the transaction that committed the row modification along with a commit timestamp thereby allowing embodiments to determine the point in time when a given version came into existence. Alternatively, committed transactions and associated timestamps may be maintained separately from the versions that correspond to same. For example, and as will be discussed further below, a commit history table may be maintained that includes the transaction identifiers and commit timestamps for each committed transaction.

Thereafter, a pushed down query will use the row versions to view data as it existed at the start of the transaction or query instead of protecting all reads with locks. By using row versioning, the chance that a read operation will block other transactions is greatly reduced, while simultaneously providing statement-level or transaction-level read consistency. Snapshot isolation in QP pushdown will now be described with reference to CN pushdown manager 232 and PS pushdown manager 234 of computing system 202 as shown in FIG. 2 and distributed database system 300 of FIG. 3, and in conjunction with flowchart 400 of FIG. 4.

With reference to FIG. 3, suppose user device(s) 102 sends a query to secondary compute node 306-1. As mentioned above, secondary compute node 306-1 of compute nodes 302 is configured to generate and send QP pushdown 314 whereby some of the query processing necessary for generating and returning a result for the query to user device(s) 102 is pushed down to at least some of page servers 308. Note, although the QP pushdown operations are presently described as being pushed down by secondary compute node 306-1, embodiments are not so limited. In embodiments, QP pushdown operations may be initiated by any of compute nodes 302 including primary compute node 304. The first step in performing such QP pushdown is for secondary compute node 306-1 to determine which of page servers 308 should receive pushed-down QP tasks. For example, and where secondary compute node 306-1 is assumed to be an instance of computing system 202 of FIG. 2, index manager 210 of CN pushdown manager 232 may be configured to use the received query and to determine indexes of data pages required for the QP pushdown operations based on page index(es) 226. As described herein above, page index(es) 226 comprise an index of data pages associated the database, wherein the index(es) identify parent and leaf data page structures as well as page servers that maintain particular data pages. As such, CN pushdown manager 232 may determine which of page servers 308 should receive QP pushdown 314. In another embodiment, appropriate page servers 308 may be determined by pushdown generator 214 in conjunction with index manager 210.

Having determined where the QP pushdown must be sent, pushdown generator 214 of CN pushdown manager 232 next generates the pushdown operations for provision to the appropriate page servers of page servers 308. In particular, pushdown generator 214 may generate query fragments including query operators and expressions to be received and processed by PS pushdown manager 234 as will be discussed further herein below. Alternatively, pushdown generator 214 may simply provide the original query as part of QP pushdown 314. In addition to the query and/or query fragments, pushdown generator 214 must also generate a transaction context to provide as part of QP pushdown 314.

A transaction context comprises a snapshot of transaction-related information maintained by secondary compute node 306-1 that reflects the state of the database at secondary compute node 306-1 at a particular moment in time. Although secondary compute node 306-1 is capable of determining which version of a row it should be able to see at any given moment in time, the same is not necessarily true of page servers 308 because one or more such servers may not be transactionally synchronized with secondary compute node 306-1. For example, primary compute node 304 may have committed a number of transactions, provided corresponding log records to log server 310, and replication of such log records to page servers 308 and secondary compute node 306-1 may be not be synchronized. For example, page server 308-1 may have received and processed the replicated log records for all updates performed by primary compute node 304, whereas secondary compute node 306-1 may not. In that instance, page server 308-1 is not capable of determining which version of the relevant data objects in its pages should be returned to secondary compute node 306-1. Accordingly, embodiments must provide the transaction context as part of QP pushdown 314 which will enable the relevant page server (in this example, page server 308-1) of page servers 308 to determine which row versions to return.

In embodiments, a transaction context may include a snapshot of a commit history table, an aborted transaction map, a snapshot timestamp and a maximum useful transaction identifier. The commit history table is maintained by each of compute nodes 302, and includes a transaction identifier and transaction commit timestamp for each committed transaction. Although in theory the commit history table could include such information for all committed transaction, in practice the commit history table includes only transactions committed for some predetermined period of time before the current time. Note, the commit history table may be different for each of compute nodes 302 since, as described above, replication of transaction log records 318 to each may be in various stages of completion, and a given compute nodes 302 may not yet be aware of certain committed transactions.

The aborted transaction map is a listing of all aborted transactions of which the compute node is aware. Similar to the commit history table, an aborted transaction map includes a transaction identifier for each such aborted transaction. Also similar to the commit history table, the aborted transaction map may be temporally scoped only to those transactions aborted within some predetermined period of time before the current time. The snapshot timestamp reflects the instant in time when the snapshots of the commit history table and aborted transaction map is taken. The maximum useful transaction identifier may comprise any information that corresponds to a particular transaction such as the transaction ID for the transaction, or the log sequence number associated with a transaction log record. With continued reference to FIGS. 2 and 3, flowcharts 400 and 500 of FIGS. 4 and 5 will now be described.

Figure 4:
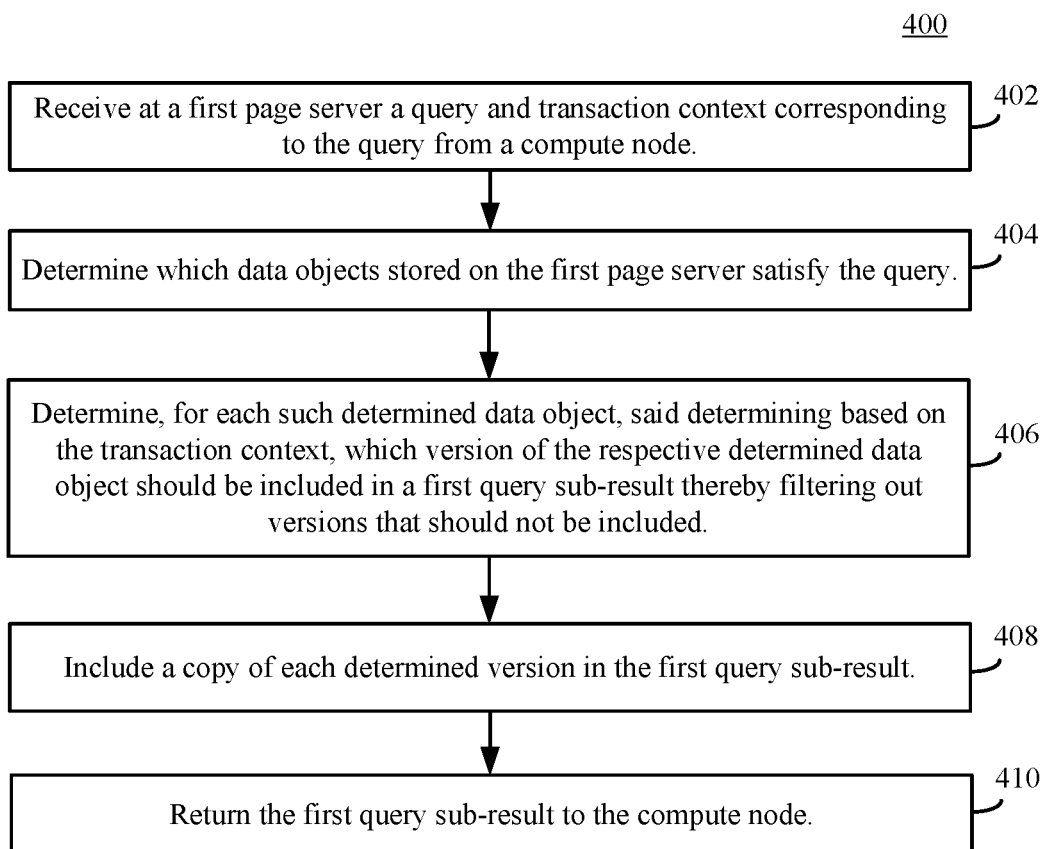
FIG. 4 depicts a flowchart for data and schema modification concurrency in query processing pushdowns, in accordance with an example embodiment.

Regarding FIG. 4, flowchart 400 begins with step 402. At step 402, a query and transaction context corresponding to the query is received at a first page server from a compute node. For example, and with continued reference to computing system 200 and distributed database system 300 of FIGS. 2 and 3, respectively, page server 308-1 of page servers 308 as shown in FIG. 3 is configured to receive QP pushdown 314 from secondary compute node 306-1 where QP pushdown 314 comprises a transaction context and query or query fragment as described herein above. Flowchart 400 continues at step 404.

At step 404, data objects stored on the first page server and which satisfy the query are determined. For example, and with continued reference to computing system 200 and distributed database system 300 of FIGS. 2 and 3, respectively, page server 308-1 comprises an instance of computing system 202 along with an instance of PS pushdown manager 234. PS pushdown manager 234 includes pushdown engine 220 and version scanner 216. As described above, pushdown engine 220 may be configured to determine, alone or in conjunction with operations processor 222, which database objects (e.g., rows) satisfy the query and for each such object. Flowchart 400 continues at step 406.

At step 406, for each such determined data object, determine based on the transaction context which version of the respective determined data object should be included in a first query sub-result thereby filtering out versions that should not be included. For example, and with continued reference to computing system 200 and distributed database system 300 of FIGS. 2 and 3, respectively, page server 308-1 comprises an instance of computing system 202 along with an instance of PS pushdown manager 234 which includes pushdown engine 220 and version scanner 216. As described above, version scanner 216 is configured to determine which version of a given object is visible given a transaction context. Version scanning performed by version scanner 216 may be performed in various ways. For example, flowchart 500 of FIG. 5 for version scanning to enable data and schema modification concurrency in query processing pushdowns, in accordance with an example embodiment. Flowchart 500 starts at step 502.

At step 502, data objects stored on a page server which satisfy a query are determined. For example, step 502 is essentially the same as analogous step 404 of flowchart 400 of FIG. 4 as described above. More specifically, and with continued reference to computing system 200 and distributed database system 300 of FIGS. 2 and 3, respectively, page server 308-1 comprises an instance of computing system 202 along with an instance of PS pushdown manager 234. PS pushdown manager 234 includes pushdown engine 220 and version scanner 216. As described above, pushdown engine 220 may be configured to determine, alone or in conjunction with operations processor 222, which database objects (e.g., rows) satisfy the query and for each such object. Flowchart 500 continues at step 504.

At step 504, for each version of each such data object, and based on a commit history table, a version commit timestamp of a version transaction corresponding to the respective version is determined. For example, and with continued reference to computing system 200 and distributed database system 300 of FIGS. 2 and 3, respectively, a commit history table is included in the transaction context provided to page server 308-1 as part of QP pushdown 314, as described above. The commit history table includes the transaction identifiers and commit timestamps of recently committed transactions as also described above. Likewise, each version of data objects (e.g., rows) in the database includes a transaction identifier for the transaction responsible for committing that particular version. Version scanner 216 is configured to scan the commit history table for the transaction that corresponds to the transaction that committed the respective version, and determine its commit timestamp which comprises the version commit timestamp. Flowchart 500 concludes at step 506.

At step 506, for each version of each such data object, the respective version should be included in a result set only if it is determined that the version transaction identifier corresponding to the respective version is not included in an aborted transaction map, the version transaction identifier corresponding to the respective version is less than a maximum useful transaction identifier and a snapshot timestamp is greater than the version commit timestamp. For example, and with continued reference to computing system 200 and distributed database system 300 of FIGS. 2 and 3, respectively, version scanner 216 is configured to select a given object version in a result set if three conditions are met. First, version scanner 216 may obtain the transaction identifier for each version of the data object and compare such identifiers with those included in the aborted transaction map provided to page server 308-1 as part of the transaction context of QP pushdown 314. Any version that corresponds to an aborted transaction should not be included in the result set.

Second, version scanner 216 is configured to filter out any version of the data object that corresponds to a transaction newer than the maximum useful transaction identifier. More specifically, version scanner 216 shall include a version in the result set only where the transaction identifier corresponding to that version is less than the maximum useful transaction identifier.

Third and last, version scanner 216 is configured to compare the snapshot timestamp included with the transaction context provided by secondary compute node 306-1 in QP pushdown 314 with the version commit timestamp determined above at step 502, and filter out the versions that are newer than the snapshot timestamp (that is, select only versions where the snapshot timestamp is greater than the version commit timestamp).

Figure 5:
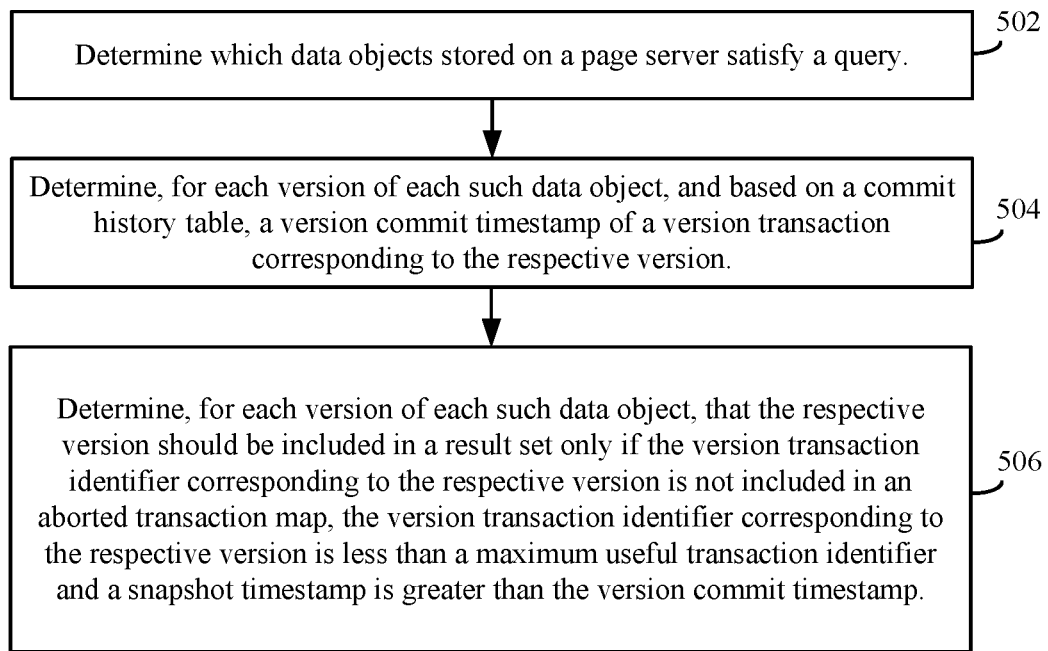
FIG. 5 depicts a flowchart for version scanning to enable data and schema modification concurrency in query processing pushdowns, in accordance with an example embodiment.

Note that although flowchart 500 of FIG. 5 is couched in terms of a set of conditions that must be satisfied for a version to be included in a result set, embodiments need not implement such logic literally and may instead implement the logical complement. For example, step 504 of flowchart 500 of FIG. 5 can be paraphrased as: Include VersionX if A and B and C. A logically equivalent test comprises: Exclude VersionX if NOT A or NOT B or NOT C. That is, each version of an object may be considered in turn, where a version will be excluded from the result set if any of the complementary conditions are false. More specifically, a version will be excluded if any of the following are true: the transaction corresponding to the version is on the aborted transaction map, the version transaction identifier is greater than the maximum useful transaction identifier or the snapshot timestamp is less than the version commit timestamp. Description of flowchart 400 of FIG. 4 now continues with at step 408.

At step 408, a copy of each determined version is included in the first query sub-result. For example, and with continued reference to computing system 200 and distributed database system 300 of FIGS. 2 and 3, respectively, having determined the version(s) of the data object(s) that are responsive to the query and visible, version scanner 216 may provide identifiers for such versions to pushdown engine 220 and/or operations processor 222 for selection of such objects for inclusion in a query result (e.g., rowset). Flowchart 400 concludes at step 410.

At step 410, the first query sub-result is returned to the compute node. For example, and with continued reference to computing system 200 and distributed database system 300 of FIGS. 2 and 3, respectively, operations processor 222 and/or pushdown engine 220 are configured to return the query result to secondary compute node 306-1.

The above description of flowcharts 400 and 500 of FIGS. 4 and 5, respectively, as well as the corresponding description of the operation of compute node and page server instances of computing system 202 and its components, is framed in terms of the interactions between a single compute node and a single page server. It should be understood, however, that QP pushdown 314 may be directed to multiple page servers of page servers 308, with the QP pushdown 314 directed to each being specifically tailored for that page server depending on the data objects being managed by each page server. Alternatively, QP pushdown 314 distributed to each page server may be identical. Of course, the query results returned by each page server to the compute node will be different because the underlying data managed by each page server is different, and each such result returned comprises merely a sub-result. Embodiments of compute nodes 302 are configured to accept the results from the page servers, and aggregate that data into a final result for transmission to the caller (e.g., user device(s) 102 as shown in FIG. 3). Moreover, embodiments of compute nodes 302 may be configured to aggregate such data for return with no further filtering of the rows either before or after aggregation.

The above-described versioning-based snapshot isolation enables data modification concurrency. Embodiments are likewise configured to enable schema modification concurrency as shall now be described with continued reference to computing system 200 and distributed database system 300 of FIGS. 2 and 3, respectively. Metadata is data about data, and in the context of databases, is referred to as a schema. The term "schema" refers to the organization of data as a blueprint of how the database is constructed. For example, in the context of a relational database, the schema shows how the database is divided into tables and likewise may define the type and meaning for each column of a table.

Certain conventional database systems, whether distributed or not, are generally constrained to a single active schema version at any one time. That is, although schema may be modified using data definition language (DDL) operations, the lack of metadata versioning means that snapshot isolation as described herein above is not possible. Embodiments described herein, however, solve this problem by essentially spoofing relevant schema identifiers such that all schema included in QP pushdown operations are globally unique. This technique is generally described as follows.

Consider a scenario where, for example, primary compute node 304 of distributed database system 300 of FIG. 3 receives a schema modification (DDL) command to modify a table schema, and executes such command. The schema modifications will eventually replicate to other nodes of compute nodes 302 and to the servers of page servers 308 via the log record replication process described herein above. After such time as the log record corresponding to the DDL command replicates to a page server such as, for example, page server 308-1, subsequent QP pushdown commands from primary compute node 304 to page server 308-1 will execute against any schema or schemas modified by the DDL command since both the primary compute node 304 and page server 308-1 are transactionally synchronized with respect to table data and the metadata describing that table.

Now consider the same example above, but where a second compute node such as, for example, secondary compute node 306-1 wants to perform QP pushdown operations scoped to the table modified by the DDL command above, but secondary compute node 306-1 has not yet received the replicated transaction log records 318 that correspond to the DDL command. In that instance, the most current data for the table as stored on page server 308-1 corresponds to the new schema (i.e., the schema after being modified by the DDL command), whereas the query/query fragment and metadata included in QP pushdown 314 propagated from secondary compute node 306-1 to page server 308-1 necessarily corresponds to the old schema (i.e., the schema as it existed prior to the DDL command). Even though the most current data for the table stored on page server 308-1 corresponds to the new schema, note that older versions of the table at page server 308-1 continue to correspond to the old schema. Thus, page server 308-1 may in theory service QP pushdown operations scoped to either the version of the table corresponding to the pre-DDL schema, or to the version corresponding to the post-DDL schema. In the absence of schema versioning support in distributed database system 300, however, page server 308-1 cannot perform such operations at the same time (i.e., concurrently).

Embodiments solve this issue by performing a schema modification step prior to pushing down the schema to a page server. In particular, secondary compute node 306-1 can avoid a schema conflict in QP pushdown operations by modifying any schema or schemas to be pushed down so that certain identifiers are globally unique. Such identifiers comprise a table name, a table identifier, an object identifier and a rowset identifier. By using the modified schema or schemas, pushdown engine 220 will not encounter a schema conflict when building an executable query plan for the pushed down query/query fragment.

In this scenario, recall that page server 308-1 is operating against the most current data and such data corresponds to the DDL-modified schema, whereas secondary compute node 306-1 does not as yet know about the schema modification and so is operating from an older schema. The older schema is still viable for use against the modified table since the data in the table is itself versioned as described above. That is, application of the row filtering operation described above in relation to flowcharts 4 and 5 of FIGS. 4 and 5, respectively, will filter out any rows that correspond to the new schema, and the visible and unfiltered rows may properly be construed by reference to the appropriate modified schema or schemas included in QP pushdown 314 sent from secondary compute node 306-1. Said another way, embodiments permit QP pushdown operations using different versions of a schema by changing its identifiers to be globally unique thereby allowing the system to identify queries as being performed with unique schemas rather than different versions of the same schema, and relying on row filtering mechanisms to filter out row versions scoped to the newer schema.

Furthermore, embodiments may generate globally unique names and ids not just for different schemas, but also for indexes used by the pushdown queries. For example, suppose a table has a clustered B-tree index (identified as 'Id_1'), and two non-clustered B-tree indexes (identified as 'ID_2' and 'ID_3'). Where three different QP pushdown operations are each scoped to a different one of these indexes, embodiments may modify the identifiers of each index to be globally unique.

Such operations may be accomplished in a number of ways. For example, suppose computing system 202 of FIG. 2 is configured as a compute node such as, for example, secondary compute node 306-1, and is performing QP pushdown. As described above, pushdown generator 214 of CN pushdown manager 232 generates the pushdown operations for provision to the appropriate page servers of page servers 308. In addition to queries and/or query fragments and a transaction context, pushdown generator 214 may likewise be configured to generate modified schema or schemas for objects scoped to the query operations being pushed down, and to provide such modified schema or schemas in QP pushdown 314 as provided to one or more of page servers 308.

In other embodiments, metadata manager 212 of CN pushdown manager 232 may instead be configured to generate modified schemas or schemas for objects scoped to the query operations being pushed down. In still other embodiments, an instance of metadata manager 212 may be included in PS pushdown manager 234 and be configured to modify schema(s) in the same manner. That is, instead of schema modification being performed on, for example, secondary compute node 306-1, pushdown generator 214 of CN pushdown manager 232 may pushdown unmodified schemas to one or more of page servers 308 while signaling to the page server that it (via its own instance of metadata manager 212) should modify the schemas as necessary.

Figure 6:
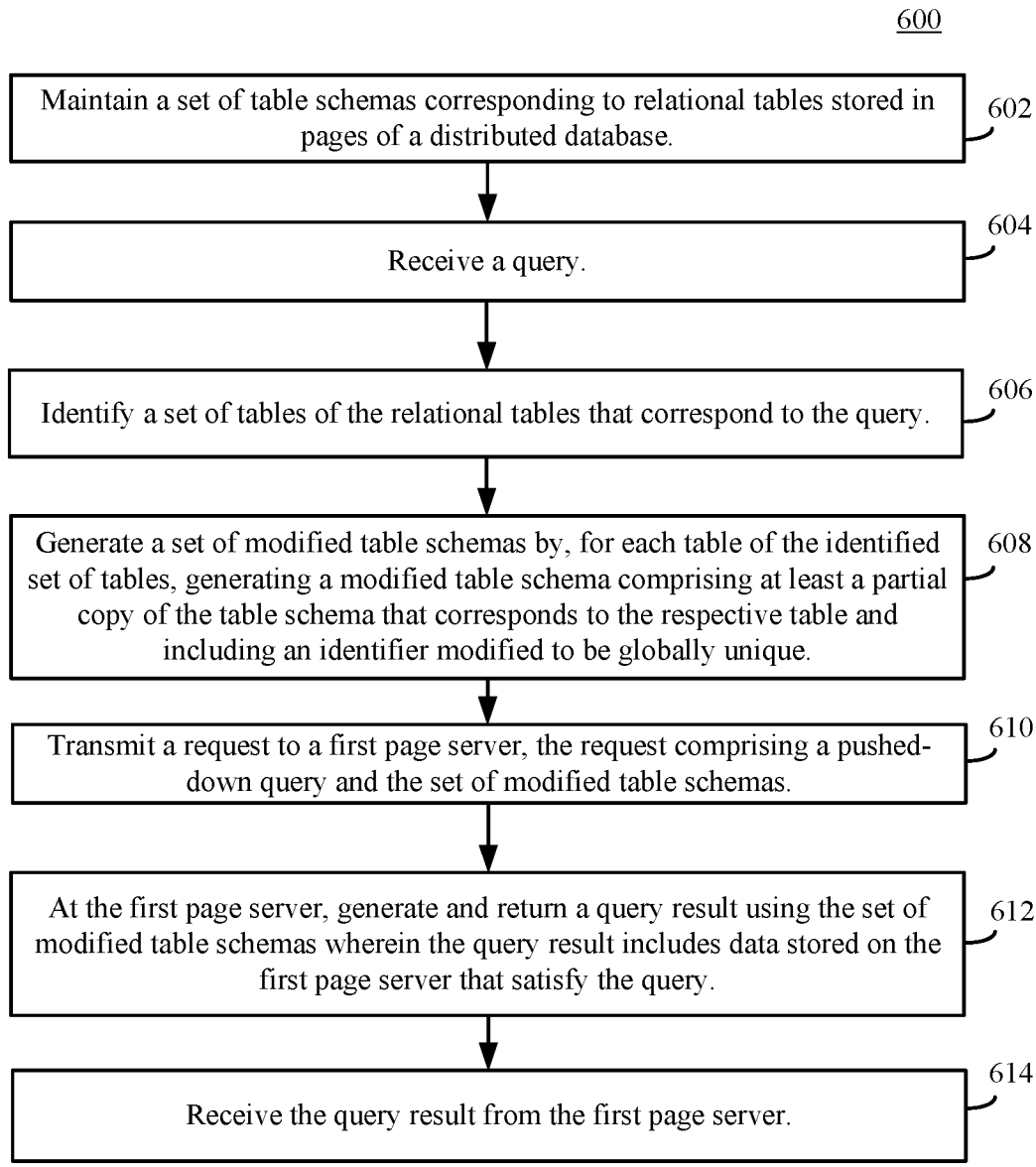
FIG. 6 depicts a flowchart of a method for enabling schema modification concurrency in query processing pushdowns, in accordance with an example embodiment.

One manner of performing these operations is illustrated in flowchart 600 of FIG. 6 which depicts a method for enabling schema modification concurrency in query processing pushdowns, in an embodiment. System 100A in FIG. 1A, system 100B in FIG. 1B, system 200 in FIG. 2 and/or distributed database system 300 of FIG. 3 are configured to operate according to flowchart 600. Further structural and operational examples will be apparent to persons skilled in the relevant art(s) based on the following descriptions.

Flowchart 600 begins at step 602. In step 602, a set of table schemas is maintained, the set of table schemas corresponding to relational tables is maintained stored in pages of a distributed database. For example, and with reference to computing system 200 and distributed database system 300 of FIGS. 2 and 3, respectively, primary compute node 304 of distributed database system 300 comprises an instance of computing system 202 and, as described herein above, maintains schemas for tables that correspond to those stored in pages maintained by page servers 308. Flowchart 600 continues at step 604.

At step 604, a query is received. For example, and with continued reference to computing system 200 and distributed database system 300 of FIGS. 2 and 3, respectively, a query may be sent from user device(s) 102 as shown in distributed database system 300 of FIG. 3, and be received by primary compute node 304. Flowchart 600 continues at step 606.

At step 606, a set of tables of the relational tables that correspond to the query is identified. For example, and with continued reference to computing system 200 and distributed database system 300 of FIGS. 2 and 3, respectively, metadata manager 212 of computing system 202 as depicted in FIG. 2 is configured to determine metadata needed for QP pushdown operations to be performed by a page server, as described above. Flowchart 600 continues at step 608.

At step 608, a set of modified table schemas is generated by, for each table of the identified set of tables, generating a modified table schema comprising at least a partial copy of the table schema that corresponds to the respective table and including an identifier modified to be globally unique. For example, and with continued reference to computing system 200 and distributed database system 300 of FIGS. 2 and 3, respectively, metadata manager 212 of computing system 202 as depicted in FIG. 2 is configured to determine metadata needed for, and to generate versions of metadata and/or modify metadata associated with a database for, performing QP pushdown operations to be performed by a page server as described above. More specifically, metadata manager 212 is configured to create a copy of each table schema identified at step 606 above, and to modify the copy such that at least one identifier therein is modified to be globally unique. For example, one or more of a table name, table identifier, object identifier and a rowset identifier may be modified to be globally unique. Flowchart 600 continues at step 610.

At step 610, a request is transmitted to a first page server, the request comprising a pushed-down query and the set of modified table schemas. For example, and with continued reference to computing system 200 and distributed database system 300 of FIGS. 2 and 3, respectively, primary compute node 304 is configured to transmit QP pushdown 314 to at least one of page servers 308 such as, for example, page server 308-1 and in the manner described above. In addition to the transaction context and query or query fragment described herein above, primary compute node 304 further includes the modified table schemas in QP pushdown 315. Flowchart 600 continues at step 612.

At step 612, at the first page server, a query result is generated and returned using the set of modified table schemas wherein the query result includes data stored on the first page server that satisfy the query. For example, and with continued reference to computing system 200 and distributed database system 300 of FIGS. 2 and 3, respectively, page server 308-1 comprises an instance of computing system 202 as shown in FIG. 2, and includes PS pushdown manager 234. Pushdown engine 220 of PS pushdown manager 234 is configured to use any schema or schemas and query/query fragments received in QP pushdown 314 to generate an executable query plan for the QP operation that may thereafter be executed by operations processor 222 to generate a query result. Because the modified table schema or schemas included in QP pushdown 314 are globally unique, no schema conflict can arise where such schema corresponds to an earlier version of a schema. As part of such QP operations, version scanner 216 is configured as described above to filter out query results that are not visible based on the transaction context included in QP pushdown 314, and in so doing, eliminate rows that are scoped to a schema version that is newer than that pushed down in QP pushdown 314. Any row(s) that remains after filtering is subsequently returned as a query result to primary compute node 304. Flowchart 600 concludes at step 614.

At step 614, the query result is received from the first page server. For example, and with continued reference to computing system 200 and distributed database system 300 of FIGS. 2 and 3, respectively, primary compute node 304 is configured to receive query results from, for example, page server 308-1.

III. Example Computer System Implementation

As noted herein, the embodiments described, including but not limited to, system 100A of FIG. 1A, system 100B of FIG. 1B and/or system 300 of FIG. 3, along with any components and/or subcomponents thereof, as well any operations and portions of flowcharts/flow diagrams described herein and/or further examples described herein, may be implemented in hardware, or hardware combined with software and/or firmware including being implemented as computer program code/instructions configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 7:
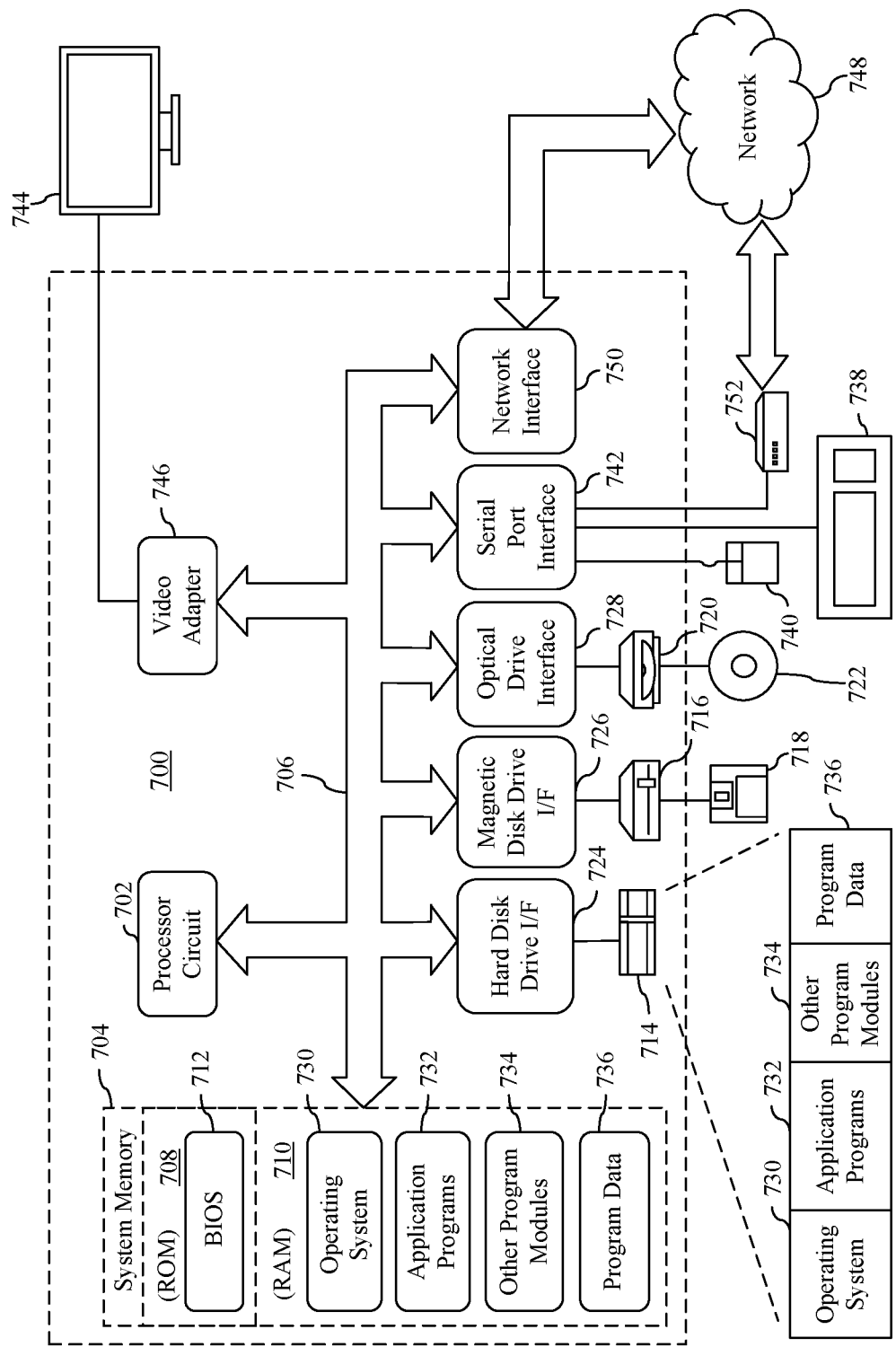
FIG. 7 is a block diagram of an example computer system in which embodiments may be implemented.

FIG. 7 depicts an exemplary implementation of a computing device 700 in which embodiments may be implemented. For example, embodiments described herein may be implemented in one or more computing devices similar to computing device 700 in stationary or mobile computer embodiments, including one or more features of computing device 700 and/or alternative features. The description of computing device 700 provided herein is provided for purposes of illustration and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing embodiments described herein, such as but not limited to system 100A of FIG. 1A, system 100B of FIG. 1B and/or system 300 of FIG. 3, along with any components and/or subcomponents thereof, as well as the flowcharts/flow diagrams described herein, including portions thereof, and/or further examples described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and propagating signals (do not include communication media or propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments described herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

As described, systems and devices embodying the techniques herein may be configured and enabled in various ways to perform their respective functions for enabling schema and data modification concurrency in query processing pushdowns. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein also include distinguishing aspects over distributed query processing systems. For example, in distributed query processing, metadata may be stored on remote or linked servers and be fetched or read by a primary compute node when needed for compilation of queries. Under such circumstances, remoted queries may be delegated without shipping metadata to the remote server because the metadata is already present and maintained there. In contrast, the embodiments herein account for metadata that is maintained on or by a compute node, where a subset of data pages of the database may be stored on or managed by each page server, but wherein no single page server has the complete set of metadata for the database. According to the described embodiments, metadata required by a page server for executing pushed-down query operations is serialized at the compute node and thereafter provided to the page servers for the purpose of enabling compilation and execution of said operations thereon.

According to the described embodiments that enable schema and data modification concurrency in query processing pushdowns, solutions are provided with unique components and configurations to improve processing loads and efficiency in systems of compute nodes and page servers, reduce memory pressure at compute nodes, and greatly reduce network bandwidth usage and I/O operations between compute nodes and page servers, while also providing faster times to complete operations, e.g., via pushdown operations, that were previously not available for software-based services, much less for the specific embodiments described herein for compute nodes and associated page servers. Accordingly, improved query performance for analytical queries against large data sets are realized by the described embodiments.

The additional examples and embodiments described in this Section may be applicable to examples disclosed in any other Section or subsection of this disclosure.

A method in a first page server of a distributed database system is provided herein. The distributed database system further including a compute node, the first page server configured to store pages of data including data objects for which multiple versions of such objects are maintained and wherein each version corresponds to a version transaction that is associated with a version transaction identifier and a version commit timestamp, the method comprising: receiving a query and transaction context corresponding to the query from the compute node; determining which data objects stored on the first page server satisfy the query; determining for each such determined data object, said determining based on the transaction context, which version of the respective determined data object should be included in a first query sub-result thereby filtering out versions that should not be included; including a copy of each determined version in the first query sub-result; and returning the first query sub-result to the compute node.

In another embodiment of the foregoing method, the transaction context is generated by the compute node in response to receiving the query, the transaction context comprising: a snapshot of each of a commit history table and an aborted transaction map, wherein the commit history table includes a transaction identifier and transaction commit timestamp for each of one or more transactions previously committed to the database, and wherein the aborted transaction map includes a transaction identifier for each of one or more transactions previously aborted and not committed to the database; a snapshot timestamp corresponding to the time the snapshot was taken; and a maximum useful transaction identifier.

In yet another embodiment of the foregoing system, determining based on the transaction context which version of the respective determined data object should be included in the first query sub-result comprises, for each version of the respective determined data object: determining based on the commit history table the version commit timestamp of the version transaction corresponding to the respective version; determining the respective version of the respective determined data object should be included in the result set only if: the version transaction identifier corresponding to the respective version is not included in the aborted transaction map; the version transaction identifier corresponding to the respective version is less than the maximum useful transaction identifier; and the snapshot timestamp is greater than the version commit timestamp.

An embodiment of the foregoing method further comprises: receiving the first query sub-result at the compute node; and the compute node providing a query result based on the first query sub-result and without further filtering of the first query sub-result.

An embodiment of the foregoing method the distributed database system further includes a second page server, the method further comprising: receiving the query and transaction context at the second page server, the second page server configured to execute the query to generate a second query sub-result; receiving the second query sub-result at the compute node; and the compute node thereafter providing a query result based on a combination of the first and second query sub-results.

A distributed database system is provided herein. The distributed database system including a distributed database that stores pages that include relational tables, at least one relational table enabled to maintain multiple versions of at least one row in the respective table, each version corresponding to a version transaction that is associated with a version transaction identifier and a version commit timestamp, the distributed database system comprising: a first page server configured to store a subset of the pages of the distributed database; a primary compute node maintaining a set of table schemas a subset of which correspond to the relational tables of the subset of pages, the primary compute node configured to: receive a first query; collect first query table schemas for each table referenced by the first query; for each first query table schema collected, modify an identifier of the respective schema to be globally unique thereby generating first modified query table schemas; generate a transaction context corresponding to the first query; and push down the first modified query table schemas, the transaction context and the first query to the first page server; the first page server further configured to: receive the first modified query table schemas, the transaction context and the first query from the primary compute node; execute the received first query using the first modified query table schemas to generate a first query result; and return the first query result to the primary compute node.

In an embodiment of the foregoing distributed database system, the identifier of the respective schema comprises one or more of: a table name; a table identifier; an object identifier; and a row set identifier.

In an embodiment of the foregoing distributed database system, wherein the transaction context comprises: a snapshot of each of a commit history table and an aborted transaction map, wherein the commit history table includes a transaction identifier and transaction commit timestamp for each of one or more transactions previously committed to the database, and wherein the aborted transaction includes a transaction identifier for each of one or more transactions previously aborted and not committed to the database; a snapshot timestamp corresponding to the time the snapshot was taken; and a maximum useful transaction identifier.

In an embodiment of the foregoing distributed database system, the first page server is further configured to execute the received first query by: identifying rows that satisfy the first query and for each such row for which multiple versions are maintained, filtering out the versions of the respective row that should not be returned in the first query result, said filtering based on the transaction context; including a copy of each that is not filtered out row in the first query result; and returning the first query result to the primary compute node.

In an embodiment of the foregoing distributed database system, filtering out the versions of the respective row that should not be returned in the first query result comprises, for each version of the respective row: determining, based on the commit history table, a version commit timestamp of the version transaction corresponding to the respective version of the respective row; determining the respective version of the respective row should be filtered out and not returned in the first query result if: the version transaction identifier corresponding to the respective version of the respective row is found on the aborted transaction map; the version transaction identifier corresponding to the respective version of the respective row is greater than the maximum useful transaction identifier; or the snapshot timestamp is less than the version commit timestamp.

An embodiment of the foregoing distributed database system further comprises: receiving the first query result at the primary compute node; and the primary compute node providing a query result based on the first query result and without further filtering of the first query result.

In an embodiment of the foregoing distributed database system, the primary compute node is further configured to: receive a schema modification command; and execute the schema modification command to perform a transaction modifying at least one schema of the first query table schemas, said transaction generating a transaction log record.

An embodiment of the foregoing distributed database system further comprises: a secondary compute node; a log server configured to accept the transaction log record from the primary compute node, persist the transaction log record to a cache, and thereafter replicate the transaction log record to the first page server and to the secondary compute node.

An embodiment of the foregoing distributed database system further comprises a second page server configured to: receive, after replication of the transaction log record to the first page server is complete, the first query and the first transaction context from the primary compute node; execute the first query to generate a second query result, and wherein the primary compute node is further configured to: receive the second query result from the second page server; and provide a final query result based on a combination of the first and second query results.

In an embodiment of the foregoing distributed database system, the secondary compute node is configured to: receive, prior to completion of the replication of the transaction log record to the secondary compute node, a second query; collect second query table schemas for each table referenced by the second query, at least one second query table schema corresponding to a schema modified by the schema modification command; for each second query table schema collected, modify an identifier corresponding to the respective schema to be globally unique thereby generating second modified query table schemas; push down the second modified query table schemas and the second query to the first page server; the first page server enabled to concurrently execute the first and second queries by being further configured to: receive the second modified query table schemas and the second query from the secondary compute node; execute the received second query using the second modified query table schemas to generate a third query result; and return the third query result to the secondary compute node.

A system including a distributed database storing pages of data is provided herein. The system comprising: a primary compute node; a first page server configured to store a subset of pages of the distributed database, and to execute pushed-down queries provided by the primary compute node, said queries scoped to the stored subset of pages, the primary compute node configured to: maintain a set of table schemas corresponding to relational tables stored in pages of the distributed database; receive a query; identify a set of tables of the relational tables that correspond to the query; generate a set of modified table schemas by, for each table of the identified set of tables, generating a modified table schema based on a table schema of the set of table schemas that corresponds to the respective table; transmit a request to the first page server, the request comprising a pushed-down query and the set of modified table schemas, wherein the first page server is further configured to generate and return a query result using the set of modified table schemas wherein the query result includes data stored on the first page server that satisfy the query; and receive the query result from the first page server.

In an embodiment of the foregoing system, generating a modified table schema comprises generating at least a partial copy of the table schema including an identifier of the copied table schema modified to be globally unique.

In an embodiment of the foregoing system, the identifier of the copied table schema comprises one or more of: a table name; a table identifier; an object identifier; and a row set identifier.

In an embodiment of the foregoing system, the primary compute node is further configured to: receive a schema modification command; and execute the schema modification command to perform a transaction modifying at least one schema of the first set of table schemas, said transaction generating a transaction log record.

An embodiment of the foregoing system further comprises: a log server configured to accept the transaction log record from the primary compute node, persist the transaction log record to a cache, and thereafter replicate the transaction log record to the first page server and to a secondary compute node.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method, comprising:
maintaining a set of table schemas corresponding to relational tables stored in pages of a distributed database;
receiving a query;
identifying a relational table that corresponds to the query as an identified relational table;
generating a modified table schema for the identified relational table based on a first table schema of a set of table schemas that corresponds to the identified relational table;
transmitting, to a first page server, a pushed-down query and the modified table schema; and
receiving a query result from the first page server.

2. The method of claim 1, wherein said generating the modified table schema comprises:
modifying an identifier of the first table schema to be globally unique; and
generating at least a partial copy of the first table schema that includes the modified identifier.

3. The method of claim 2, wherein the modified identifier comprises at least one of:
a table name;
a table identifier;
an object identifier; and
a rowset identifier.

4. The method of claim 1, further comprising:
receiving a schema modification command; and
executing the schema modification command to perform a transaction modifying at least one schema of the set of table schemas, the transaction generating a transaction log record.

5. The method of claim 4, further comprising:
transmitting the transaction log record to a log server that is configured to cache the transaction log record, and replicate the transaction log record to the first page server and to a second compute node.

6. The method of claim 1, further comprising:
generating a transaction context corresponding to the query, the transaction context comprising:
a snapshot of each of a commit history table and an aborted transaction map, wherein the commit history table comprises, for each of one or more previously committed transactions, a transaction identifier and transaction commit timestamp, and the aborted transaction map includes, for each of one or more previously aborted transactions, a transaction identifier;
a snapshot timestamp corresponding to the time the snapshot was taken; and
a maximum useful transaction identifier; and
providing the transaction context to the first page server.

7. The method of claim 6, wherein the query result comprises versions of rows of the distributed database stored at the first page server that:
satisfy the query,
correspond to a version transaction identifier not in the aborted transaction map of the snapshot,
correspond to a version transaction identifier that is less than or equal to the maximum useful transaction identifier, and
correspond to a version transaction identifier having a transaction commit timestamp in the commit history table of the snapshot that is less than the snapshot timestamp.

8. A system, comprising:
a processor;
a memory device that stores program code structured to cause the processor to:
maintain a set of table schemas corresponding to relational tables stored in pages of a distributed database;
receive a query;
identify a relational table that corresponds to the query as an identified relational table;
generate a modified table schema for the identified relational table based on a first table schema of a set of table schemas that corresponds to the identified relational table;
transmit, to a first page server, a pushed-down query and the modified table schema; and
receive a query result from the first page server.

9. The system of claim 8, wherein, to generate the modified table schema, the program code is further structured to cause the processor to:
modify an identifier of the first table schema to be globally unique; and
generate at least a partial copy of the first table schema that includes the modified identifier.

10. The system of claim 9, wherein the modified identifier comprises at least one of:
a table name;
a table identifier;
an object identifier; and
a rowset identifier.

11. The system of claim 8, wherein the program code is further structured to cause the processor to:
receive a schema modification command; and
execute the schema modification command to perform a transaction modifying at least one schema of the set of table schemas, said transaction generating a transaction log record.

12. The system of claim 11, wherein the program code is further structured to cause the processor to:
transmit the transaction log record to a log server that is configured to cache the transaction log record, and replicate the transaction log record to the first page server and to a second compute node.

13. The system of claim 8, wherein the program code is further structured to cause the processor to:
generate a transaction context corresponding to the query, the transaction context comprising:
a snapshot of each of a commit history table and an aborted transaction map, wherein the commit history table comprises, for each of one or more previously committed transactions, a transaction identifier and transaction commit timestamp, and the aborted transaction includes, for each of one or more previously aborted transactions, a transaction identifier;
a snapshot timestamp corresponding to the time the snapshot was taken; and
a maximum useful transaction identifier; and
provide the transaction context to the first page server.

14. The system of claim 13, wherein the query result comprises versions of rows of the distributed database stored at the first page server that:
satisfy the query,
correspond to a version transaction identifier not in the aborted transaction map of the snapshot,
correspond to a version transaction identifier that is less than or equal to the maximum useful transaction identifier, and correspond to a version transaction identifier having a transaction commit timestamp in the commit history table of the snapshot that is less than the snapshot timestamp.

15. A computer-readable storage medium comprising computer-executable instructions that, when executed by a processor, cause the processor to:

maintain a set of table schemas corresponding to relational tables stored in pages of a distributed database;

receive a query;

identify a relational table that corresponds to the query as an identified relational table;

generate a modified table schema for the identified relational table based on a first table schema of a set of table schemas that corresponds to the identified relational table;

transmit, to a first page server, a pushed-down query and the modified table schema; and receive a query result from the first page server.

16. The computer-readable storage medium of claim 15, wherein, to generate the modified table schema, the computer-executable instructions, when executed by the processor, further cause the processor to:

modify an identifier of the first table schema to be globally unique; and generate at least a partial copy of the first table schema that includes the modified identifier.

17. The computer-readable storage medium of claim 16, wherein the modified identifier comprises at least one of:

a table name;

a table identifier;

an object identifier; and a rowset identifier.

18. The computer-readable storage medium of claim 15, wherein the computer-executable instructions, when executed by the processor, further cause the processor to:

receive a schema modification command; and execute the schema modification command to perform a transaction modifying at least one schema of the set of table schemas, said transaction generating a transaction log record.

19. The computer-readable storage medium of claim 18, the computer-executable instructions, when executed by the processor, further cause the processor to:

transmit the transaction log record to a log server that is configured to cache the transaction log record, and replicate the transaction log record to the first page server and to a second compute node.

20. The computer-readable storage medium of claim 15, wherein the query result comprises versions of rows of the distributed database stored at the first page server that:

satisfy the query, correspond to a version transaction identifier not in an aborted transaction map of a snapshot, correspond to a version transaction identifier that is less than or equal to a maximum useful transaction identifier, and correspond to a version transaction identifier having a transaction commit timestamp in a commit history table of the snapshot that is less than a snapshot timestamp corresponding to the time the snapshot was taken.

* * * * *